Nov. 15, 1932. W. A. WHATMOUGH 1,887,897
COMBUSTION CHAMBER OF INTERNAL COMBUSTION ENGINES
Filed Dec. 27, 1929 3 Sheets-Sheet 1

Inventor
W. A. Whatmough
Per
[signature] Atty.

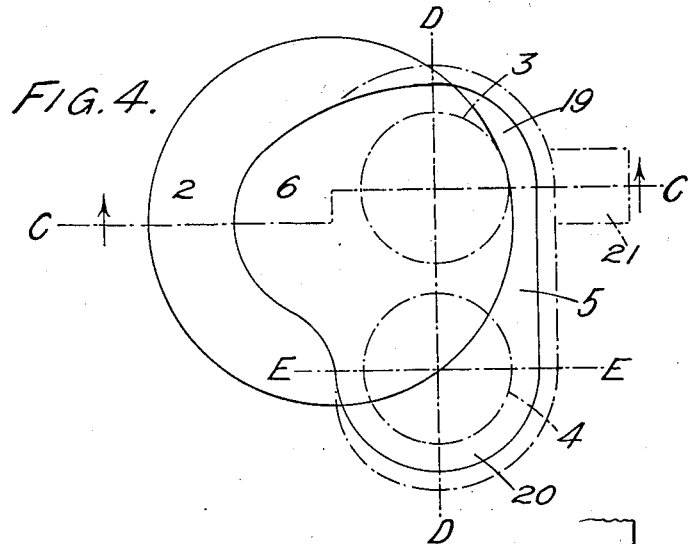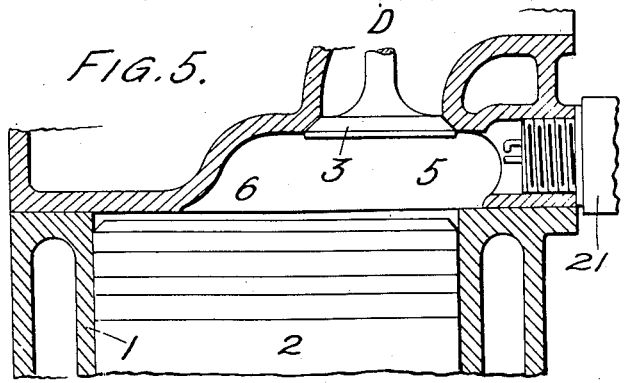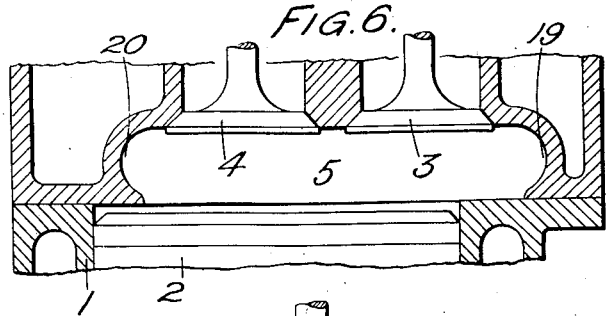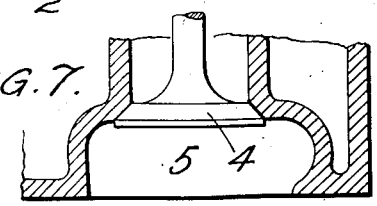

Nov. 15, 1932. W. A. WHATMOUGH 1,887,897
COMBUSTION CHAMBER OF INTERNAL COMBUSTION ENGINES
Filed Dec. 27, 1929   3 Sheets-Sheet 3
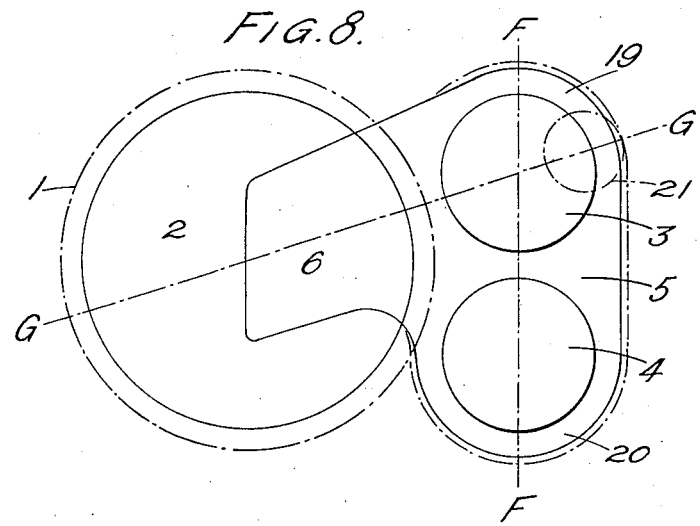
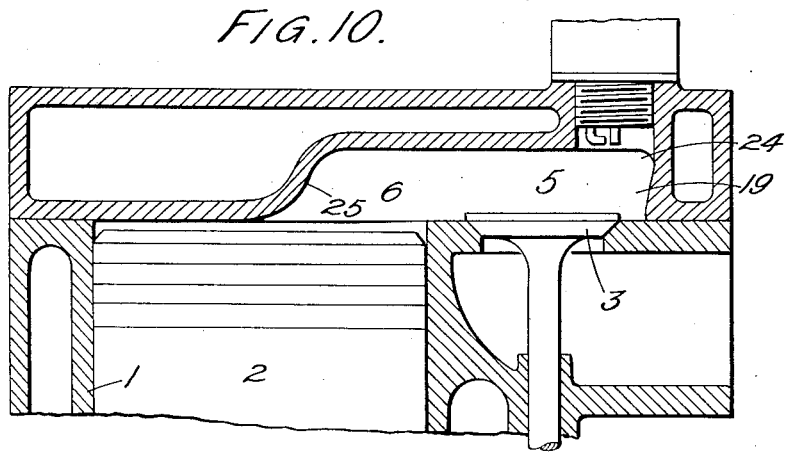
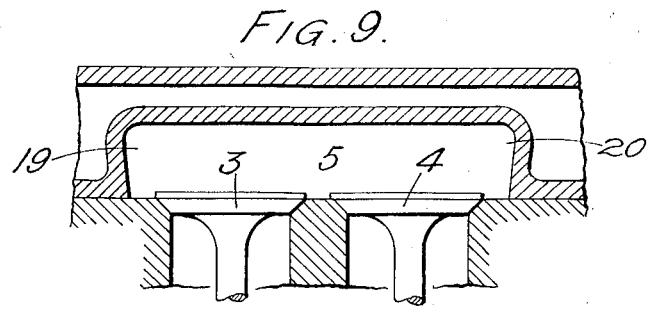

Patented Nov. 15, 1932

1,887,897

UNITED STATES PATENT OFFICE

WILFRED AMBROSE WHATMOUGH, OF NEW BARNET, ENGLAND

COMBUSTION CHAMBER OF INTERNAL COMBUSTION ENGINES

Application filed December 27, 1929, Serial No. 416,883, and in Great Britain January 16, 1929.

This invention relates to internal combustion engines having cylinder heads of the type wherein a cavity which contains at least the inlet valve and inlet port is disposed to one side of the cylinder and wherein the cavity communicates with the cylinder through a transfer passage.

According to this invention the walls of the transfer passage and valve cavity adjacent the inlet port are formed with a convex inflexion which is arranged to direct the flow of inlet gases towards the exhaust port on their way to the cylinder and a socket for an ignition device is arranged near said exhaust port.

The specific shape and dimension of the throughway for any particular engine may best be determined by flow experiments. The basic conditions to be observed are those set out in the above statement of invention.

Preferably the aforesaid cavity and transfer passage form a throughway which is shaped somewhat like an L, the exhaust port and the socket for the ignition device are situated at the crotch and the inlet valve and cylinder are disposed one at the end of each limb.

Forms of the present invention will now be described by way of example with reference to the accompanying drawings wherein:—

Figure 1:
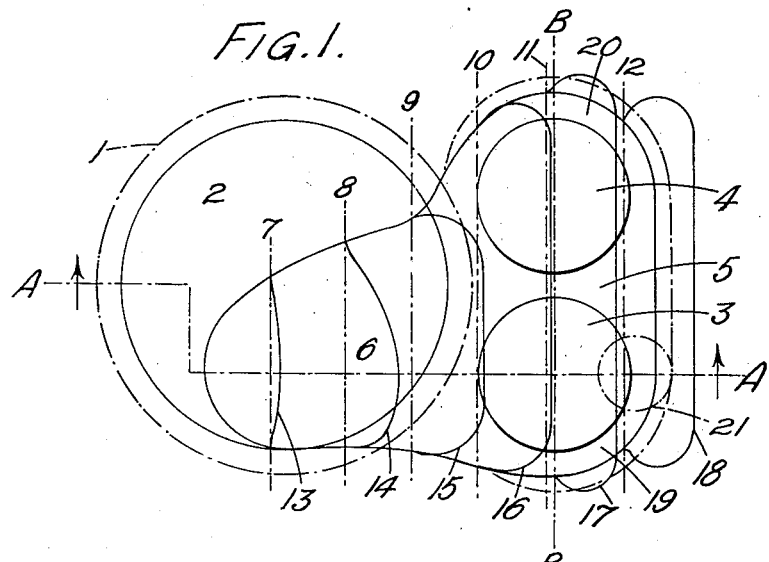
Figure 2:
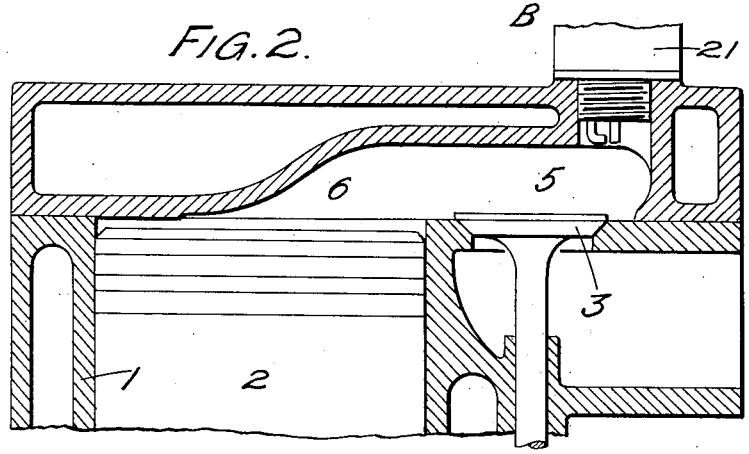
Figure 3:
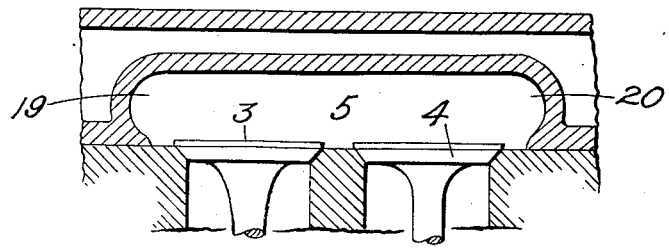

Fig. 1 shows a sectional plan of the head of an internal combustion engine having side by side valves, Fig. 2 is a section on the line A—A of Fig. 1, Fig. 3 is a section on the line B—B of Fig. 1, Fig. 4 is a sectional plan of the head of an internal combustion engine having overhead valves, Fig. 5 is a section on the line C—C of Fig. 4, Fig. 6 is a section on the line D—D of Fig. 4, Fig. 7 a section on the line E—E of Fig. 4, Fig. 8 is a sectional plan of the head of an internal combustion engine having side by side valves and with the transfer passage arranged to produce turbulence in the flow of exhaust gases, Fig. 9 is a section on the line F—F of Fig. 8 and Fig. 10 is a section on the line G—G of Fig. 8.

Like references refer to like parts throughout the drawings.

Referring to Figs. 1, 2 and 3, 1 is the cylinder, 2 the piston, 3 the exhaust valve and 4 the inlet valve, said valves being disposed side by side in the cavity 5 which communicates with the cylinder 1 through the transfer passage 6. The valve cavity and transfer passage as viewed along the axis of the cylinder is L-shaped, one limb of which is arranged to overlap the cylinder. The exhaust valve 3 is arranged at the crotch 19 of the L while the inlet valve 4 is arranged towards the extremity 20 of the other limb of the L. The lines 13, 14, 15, 16, 17 and 18 represent the inner contours of sections of the cylinder head along the lines 7, 8, 9, 10, 11 and 12 respectively. Instead of these sections being drawn separately they are shown extending along their respective section lines. The exhaust valve 3 and the inlet valve 4 are so disposed and the cavity 5 and transfer passage 6 are such that the inlet gases flowing to the cylinder pass partly over the exhaust valve 3. The line A—A on which the section shown in Fig. 2 is taken joins the centre of the exhaust valve 3 with the end of the transfer passage 6 and the throughway is so shaped that said line lies in a plane which is spaced from the walls of the transfer passage 6.

The dimensions of the throughway are such that it will pass the gases admitted by the inlet valve 4 without restriction. 21 is a sparking plug which is disposed above the exhaust valve at the side remote from the piston 2 so that the flame travels over and away from the exhaust valve 3 towards the piston 2.

The transfer passage 6 communicates with the cylinder 1 at a point which is offset from the axis thereof.

Referring to Figs. 4, 5, 6 and 7 which show an engine with overhead valves, the shape of the throughway constituted by the cavity 5 and transfer passage 6 is generally the same as that illustrated in Figs. 1, 2 and 3, with the exception that the transfer passage 6 communicates with the cylinder substantially on a diametral line.

Referring to Figs. 8, 9, and 10, the shape of the throughway constituted by the cavity 5 and the transfer passage 6 is generally the same as that illustrated in Figs. 1, 2, and 3, that is, when viewed along the axis of the cylinder is of L-shape with the exhaust valve 3 situated at the crotch, the inlet valve 4 at the end of the limb constituted by the cavity 5 and the cylinder at the end of the limb constituted by the transfer passage 6. The dimensions and shape of the throughway are so selected that it will pass the charge of gases admitted by the inlet valve at full opening without undue restriction. For certain engines it may be required to heat up the valve cavity and for this purpose the cavity is as shown in Figure 10.

The cavity as shown in Fig. 10 has more or less a corner or pocket 24 and the transfer passage has a relatively sharp change in direction of the wall 25. Such shaping causes turbulence in the exhaust gases and consequent heating of the gases and the exhaust cavity.

The shape of the wall 25 may be selected to control the amount of turbulence. For example greater turbulence will be produced if the wall 25 is arranged to project further into the cavity and less turbulence will be produced if it is rather more flattened.

What I claim is:—

1. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, inlet and exhaust ports arranged side by side in said valve cavity, the walls of which transfer passage and valve cavity adjacent said inlet port are formed with a convex inflexion extending throughout the depth of the wall to direct the inlet gases towards said exhaust port on their way to the cylinder, and a socket for an ignition device arranged near said exhaust port.

2. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, inlet and exhaust ports arranged side by side in said valve cavity, the walls of which transfer passage and valve cavity adjacent said inlet port are formed with a convex inflexion extending throughout the depth of the wall to direct the inlet gases towards said exhaust port on their way to the cylinder, and the walls of which cavity and passage extend from the exhaust port in straight lines towards the cylinder, and a socket for an ignition device arranged near said exhaust port.

3. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, inlet and exhaust ports arranged side by side in said valve cavity, the walls of which transfer passage and valve cavity adjacent said inlet port are formed with a convex inflexion extending throughout the depth of the wall to direct the inlet gases towards said exhaust port on their way to the cylinder, and the walls of which cavity and passage extend from the exhaust port in gradual curves towards the cylinder, and a socket for an ignition device arranged near said exhaust port.

4. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions and which as viewed looking along the axis of the cylinder are L-shaped, an exhaust port and a socket for an ignition device both disposed near the crotch of the L and near the opening of the transfer passage and an inlet port disposed towards the end of the limb of the L constituted by the valve cavity.

5. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, inlet and exhaust ports arranged side by side in said valve cavity, the walls of which transfer passage and valve cavity adjacent said inlet port are formed with a convex inflexion extending throughout the depth of the wall to direct the inlet gases towards said exhaust port on their way to the cylinder and a socket for an ignition device arranged on that side of the exhaust port remote from the cylinder.

6. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, inlet and exhaust ports arranged side by side in said valve cavity, the walls of which transfer passage and valve cavity adjacent said inlet port are formed with a convex inflexion extending throughout the depth of the wall to direct the inlet gases towards said exhaust port on their way to the cylinder and a socket for an ignition device arranged near said exhaust port, the cross-section of which transfer passage normal to the flow of the gases between the valve cavity and the cylinder is sufficiently large not to restrict the gases any more than does the inlet port.

7. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, the axis of which transfer passage is offset from the axis of the cylinder, inlet and exhaust ports arranged side by side in said valve cavity, the walls of which transfer passage and valve cavity adjacent said inlet port are formed with a convex inflexion extending throughout the depth of the wall to direct the inlet gases towards said exhaust port on their way to the cylinder and a socket for an ignition device arranged near said exhaust port.

8. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, inlet and exhaust ports arranged side by side in said valve cavity, the walls of which transfer passage and valve cavity adjacent said inlet port are formed with a convex inflexion extending throughout the depth of the wall to direct the inlet gases towards said exhaust port on their way to the cylinder, which transfer passage where it joins the cylinder is formed with a convex inflexion and a socket for an ignition device arranged near said exhaust port.

9. An internal combustion engine comprising in combination a cylinder, a valve cavity disposed to one side of said cylinder, a transfer passage joining said valve cavity with the cylinder, the valve cavity and the transfer passage in that part which lies to one side of the cylinder having a continuous upper surface which is free of inflexions, inlet and exhaust ports arranged side by side in the bottom wall of the valve cavity, a socket for an ignition device arranged in the roof of the cavity above the exhaust valve on that side thereof remote from the cylinder, and a rounded projection on the side wall of the cavity and transfer passage between the inlet valve and cylinder extending throughout the depth of the wall arranged to direct the inlet gases towards the exhaust port on the way to the cylinder.

10. An internal combustion engine comprising in combination a cylinder, a valve cavity disposed to one side of said cylinder, inlet and outlet ports arranged in the roof of said valve cavity, a socket for an ignition device arranged in the wall of said cavity joining the roof and the bottom wall remote from the cylinder and opposite said exhaust port and a transfer passage extending from the valve cavity near the exhaust port to the cylinder the valve cavity and the transfer passage in that part which lies to one side of the cylinder having a continuous upper surface which is free of inflexions.

11. An internal combustion engine comprising in combination a cylinder, a valve cavity disposed towards one side of said cylinder and having a flat roof and flat bottom walls and concavely curved side walls, inlet and outlet ports arranged side by side in said cavity, a socket for an ignition device arranged on that side of the exhaust port remote from the cylinder, and a transfer passage extending from opposite said exhaust port to said cylinder the valve cavity and the transfer passage in that part which lies to one side of the cylinder having a continuous upper surface which is free of inflexions.

Dated this twelfth day of December, 1929.
WILFRED AMBROSE WHATMOUGH.